3,195,983
CYANIDE DETERMINATION
Jerome A. Platte, Penn Hills Township, Allegheny County, Pa., assignor to Calgon Corporation, a corporation of Pennsylvania
No Drawing. Filed Sept. 6, 1961, Ser. No. 136,200
4 Claims. (Cl. 23—230)

This invention relates to chemical analysis for cyanide. In particular, it is a method of colorimetrically determining the quantity of cyanide in a sample. The method is especially suitable for monitoring a continuous sample.

Methods heretofore used for the determination of cyanide content in aqueous media have had several shortcomings, not the least of which are: (1) the reagents are not stable and hence must be prepared daily; and (2) where continuous analyzing apparatus is used which has plastic tubing, some of the reagents, particularly pyridine and ethyl alcohol, are destructive to the plastic tubing.

I have invented a method for the determination of cyanide which utilizes stable reagents nondestructive to plastics and the like. The method is simple and accurate and is particularly suited to continuous automatic monitoring.

My invention in its preferred form comprises, briefly, fractionally distilling the sample to be tested, and adding to the distillate a predetermined amount of a prepared solution including a metal ion and a metal complexing agent capable of exhibiting alterations of color or color density in the presence of the metal ion. The color or absorbence of the distillate so treated may then be compared to a standard. Within the limits explained below, the absorbence is reduced in direct proportion to the amount of cyanide present in the solution.

Distillation of the sample is utilized in order to separate the cyanide, or at least a known portion thereof, from substances in the sample medium known sometimes as "interfering substances." These are substances which interfere with the reaction of analytical reagents with the tested substance. Methods of distillation of batch samples are known in the art and in fact are recommended as part of standard procedures. In the case of flowing samples which are to be continuously monitored, an excellent method and apparatus for continuous distillation which assures a constant fractionation is described in detail in copending United States patent application Serial No. 114,976 of Ralph N. Thompson entitled "Continuous Sample Preparation for Chemical Analysis" filed June 5, 1961, now U.S. Patent 3,147,082. However, any method of preparing a sample free of interfering substances will be satisfactory in my invention. A base, usually sodium hydroxide, is added to the distillate to prevent the evolution of hydrogen cyanide gas.

The indicator solution is preferably a solution of copper and sodium diethyldithiocarbamate, or copper and bis-cyclohexanone oxaldihydrazone. Copper and copper-complexing agents are preferred because the specific color indicators for copper are quite sensitive to minute changes in the copper indicator solution. Zinc may also be used. In this case, the preferred complexing agents are dithizone, 2 - carboxy-2'-hydroxy-5'-sulfoformazylbenzene ("Zincon"), and 1-(1-hydroxy-2-naphthylazo)-5-nitro-2-naphthol-4-sulfonate ("Chrome Black-T"). The five mentioned exemplary reagent solutions are typically made in the following proportions:

(1) 150 mg. Zn and 2.0 g. "Zincon" per liter
(2) 10 mg. Zn and 0.5 g. dithizone per liter
(3) 10 mg. Cu and 2.0 g. bis-cyclohexanone oxaldihydrazone per liter
(4) 10 mg. Cu and 2.0 g. sodium diethyldithiocarbamate per liter
(5) 150 mg. Zn and 1.0 g. Chrome Black-T The metal is added as part of a salt. Reagent grade compounds are preferred. Any common reagent grade salt may be used.

Of course, I do not intend to be limited to the specific proportions recited above, nor do I intend to be limited to the particular metal ions and indicators mentioned. I may use any combination of copper, zinc, or other heavy metal and indicator which forms a complex having a pK value (stability constant) of less than the pK value of complexes of the metal with the cyanide radical. Other indicator-metal combinations which may be cited as examples are nickel-dimethylglyoxime and cobalt-ammonium purpurate. The indicator should preferably be present in amounts greater than the stochiometric amount required to complex all of the metal. As mentioned above, copper is the preferred metal. In addition to copper, zinc, nickel, and cobalt, other heavy metals for which indicators are known, such as iron and mercury, may be used. Although no indicator is known to me for gold and silver, these metals are also capable of forming a cyanide complex and hence could be useful in my invention if an indicator for them were found which met the conditions as to pK value recited above. I may use any heavy metal ion capable of forming a cyanide complex together with an indicator which forms a complex with such metal having a pK value less than that of the cyanide complex.

The indicator-metal complex, as will be recognized by those skilled in analytical chemistry, will always produce the same color in solution and the same density of color in a given concentration of solution. Standards may be prepared based upon these repeatable characteristics.

When a reagent thus prepared of known amounts of indicator and metal ion is contacted or mixed with a solution containing an unknown amount of cyanide, the cyanide removes metal ion from the less stable indicator complex and forms a metal-cyanide complex. To the extent that metal is removed from the indicator complex, the light absorbence of the sample is reduced. A measurement of the reduction of light absorbence of the sample is thus proportional to the cyanide content in the sample.

Theoretically, about 1.6 milligrams of cyanide is required to complex one milligram of zinc. Similarly, 1.24 mg. of cyanide is required to complex 1 mg. copper. These calculations are based upon the formula for the metal complex, $Zn(CN)_4$, for example, and may be calculated in the same manner for any metal. Of course, calibrations can be made in terms of parts per million of cyanide in the same in relation only to the absorbence of the sample without regard to the number of milligrams of metal actually complexed. A continuous analysis may be run on a colorimetric analyzer such as that of Luppold and Stough disclosed in United States patent application Serial No. 861,589 filed December 23, 1959, and now abandoned, entitled "Apparatus for Continuous Analysis of Solutions and Gases," by continuously adding to a flowing sample at a known rate a reagent solution of known strength. Such an apparatus is capable of recording changes in the absorbence of the sample treated with the reagent. A written record of cyanide concentration in terms of parts per million may thus be produced. The sample may be made free of interfering substances by the continuous distillation method of Thompson supra.

EXAMPLE I

The following table (Table I) demonstrates that the results of my invention are linear. In this demonstration a reagent solution was prepared consisting of 150 mg. of zinc (as zinc sulfate) and 2.0 g. of "Zincon" dissolved in a liter of water. Several samples of five milliliters each containing cyanide in concentrations of 0 p.p.m. CN, 2 p.p.m. CN, 4, 6, 8, and 10 p.p.m. CN were prepared. To each 5 ml. sample was added 0.3 ml. of reagent. The absorbence was then measured by a standard colorimetric analysis in the "Chemonitor," an automatic colorimeter manufactured by Hagan Chemicals & Controls, Inc. This device was used for all examples herein.

*Table I*

| CN (p.p.m.): | Absorbence |
|---|---|
| 0 | 700 |
| 2 | 568 |
| 4 | 420 |
| 6 | 275 |
| 8 | 150 |
| 10 | 10 |

The change in absorbence, however, is not linear in concentrations of cyanide below about 0.5 p.p.m. The reasons for this are not clearly understood. Nevertheless, the curve below this amount is substantially the same no matter what the indicator used.

EXAMPLE II

In another demonstration in which a reagent was prepared consisting of 10 mg. Zn (as zinc sulfate) and 0.5 g. "Zincon" per liter of water and added in 0.3 ml. amounts to 5 ml. samples of various strengths of cyanide, the significance of the curve below 0.5 p.p.m. cyanide is apparent. These results are presented in Table II:

*Table II*

| CN (p.p.m.): | Absorbence |
|---|---|
| 0 | 80 |
| 0.5 | 53 |
| 1.0 | 42 |
| 2.0 | 21 |
| 3.0 | 0 |

EXAMPLE III

Another demonstration involved the use of copper. It again showed that the results are linear except below about 0.5 p.p.m. of cyanide. A reagent containing copper was prepared by adding 10 mg. copper (as copper sulfate) and 2.0 g. bis-cyclohexanone oxaldihydrazone to a liter of deionized water. 5 ml. samples were again tested by adding 0.3 ml. of the reagent solution, and the absorbence was recorded on the "Chemonitor" as in the other examples. Results are in Table III:

*Table III*

| CN (p.p.m.) | Absorbence |
|---|---|
| 0 | 82 |
| 0.1 | 62 |
| 0.2 | 42 |
| 0.3 | 27 |
| 0.4 | 18 |
| 0.5 | 12 |
| 0.7 | 7 |
| 1.0 | 2.5 |

The examples and specifics discussed in the foregoing description are not intended to be limiting. The invention may be otherwise variously practiced within the scope of the following claims.

I claim:

1. Method of determining cyanide ion content in an aqueous sample free of interfering substances comprising:
    (a) adding to said sample a predetermined amount of a solution containing copper and bis-cyclohexanone oxaldihydrazone; and
    (b) colorimetrically analyzing the sample so treated.

2. Method of determining cyanide ion content in an aqueous solution comprising:
    (a) preparing a sample of said solution free of interfering substances;
    (b) adding to said sample a predetermined amount of a copper and bis-cyclohexanone oxaldihydrazone; and
    (c) colorimetrically analyzing the sample so treated.

3. Method of determining cyanide content in an aqueous solution comprising:
    (a) distilling said aqueous solution to form a distillate which contains hydrogen cyanide and which is free of interfering substances;
    (b) adding sufficient base to the distillate to prevent the evolution of hydrogen cyanide gas;
    (c) adding to the distillate a metal complexing agent which forms a first color when complexed with a heavy metal but which does not form the same color in the free form, and a predetermined amount of a heavy metal ion capable of forming a complex with said metal complexing agent and also capable of forming a cyanide complex in preference thereto to reduce the intensity of said color; and
    (d) measuring the absorbence of the distillate.

4. Method of continuously determining the cyanide content of an aqueous solution comprising:
    (a) continuously distilling said aqueous solution to form a distillate which contains hydrogen cyanide and which is free of interfering substances;
    (b) continuously adding to the distillate a basic solution sufficient to prevent the evolution of hydrogen cyanide gas;
    (c) continuously adding to the distillate a metal complexing agent which forms a first color when complexed with a heavy metal but which does not form the same color in the free form, and a predetermined amount of a heavy metal ion capable of forming a complex with said metal complexing agent and also capable of forming a cyanide complex in preference thereto to reduce the intensity of said color; and
    (d) continuously measuring the absorbence of the distillate.

References Cited by the Examiner

UNITED STATES PATENTS 2,678,260   5/54   Falkof et al. _____ 23—230

OTHER REFERENCES

Feigl: Chemistry of Specific, Selective and Sensitive Reactions, pp. 104–108, Academic Press Inc., New York, N.Y., 1949.

Hanker et al.: "Anal. Chem." 30, 93–95 (1958).

Kato et al.: "J. Chem. Soc., Japan, Pure Chem. Sect." 77, 885–888 (1956), in "Analytical Abstracts," 4, 435 (1957).

MORRIS O. WOLK, *Primary Examiner.*

ANTHONY SCIAMANNA, *Examiner.*

UNITED STATES PATENT OFFICE
CERTIFICATE OF CORRECTION

Patent No. 3,195,983                                July 20, 1965

Jerome A. Platte

It is hereby certified that error appears in the above numbered patent requiring correction and that the said Letters Patent should read as corrected below.

Column 4, line 12, before "copper" insert -- solution containing --.

Signed and sealed this 8th day of February 1966.

(SEAL)
Attest:

ERNEST W. SWIDER                            EDWARD J. BRENNER
Attesting Officer                                 Commissioner of Patents